United States Patent
Ogatsu

(10) Patent No.: US 8,855,728 B2
(45) Date of Patent: Oct. 7, 2014

(54) MOBILE EQUIPMENT AND SLIDING STRUCTURE THEREFOR

(75) Inventor: Toshinobu Ogatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 558 days.

(21) Appl. No.: 12/593,429

(22) PCT Filed: Mar. 28, 2008

(86) PCT No.: PCT/JP2008/056057
§ 371 (c)(1),
(2), (4) Date: Sep. 28, 2009

(87) PCT Pub. No.: WO2008/120706
PCT Pub. Date: Oct. 9, 2008

(65) Prior Publication Data
US 2010/0029349 A1 Feb. 4, 2010

(30) Foreign Application Priority Data
Mar. 30, 2007 (JP) .................................. 2007-095233

(51) Int. Cl.
*H04M 1/00* (2006.01)
*H04M 1/02* (2006.01)

(52) U.S. Cl.
CPC .................................. *H04M 1/0237* (2013.01)
USPC .................. 455/575.4; 455/550.1; 455/575.1

(58) Field of Classification Search
CPC ... H04W 88/02; H04M 1/026; H04M 1/0235; H04M 1/0237; H04M 1/0249; H04M 1/0254; H04M 1/23; H04M 1/02; H04M 1/03
USPC .................. 455/575.1, 575.4, 550.1
See application file for complete search history.

(56) References Cited

U.S. PATENT DOCUMENTS 7,433,723 B2 * 10/2008 Bae ............................ 455/575.4
7,742,100 B2 * 6/2010 Yoo et al. ....................... 348/373
(Continued)

FOREIGN PATENT DOCUMENTS

JP H08-181749 A 7/1996
JP 2001175608 A 6/2001
(Continued)

OTHER PUBLICATIONS

Electronic Translation of JP 2002-152347, published on May 24, 2002.*

(Continued)

*Primary Examiner* — Liton Miah
(74) *Attorney, Agent, or Firm* — Sughrue Mion, PLLC

(57) ABSTRACT

A sliding structure is for a mobile equipment which includes a second housing and a first housing slidably provided for the second housing. The sliding structure includes a display frame configured to accommodate a display unit of the first housing and having slide grooves provided for side walls parallel to a direction of the slide, and a slide support section provided along side walls of said second housing in parallel to the slide direction such that tip portions of said slide support section slidably engage with said slide grooves. Although having a simple mechanism, the mobile equipment has a small size and high strength, and can take a large stroke length. In this way, the sliding mechanism for the mobile equipment which has high stiffness and the mobile equipment can be provided in which a damage of the display unit can be prevented while maintaining the small size and a thin structure.

18 Claims, 7 Drawing Sheets

(56) References Cited

U.S. PATENT DOCUMENTS

| | | | |
|---|---|---|---|
| 7,747,297 B2* | 6/2010 | Koibuchi et al. | 455/575.4 |
| 2004/0157653 A1 | 8/2004 | Kato | |
| 2006/0104013 A1* | 5/2006 | Sakakibara et al. | 361/680 |
| 2006/0114646 A1* | 6/2006 | Koibuchi et al. | 361/600 |
| 2006/0128190 A1* | 6/2006 | Kato | 439/157 |
| 2007/0008165 A1* | 1/2007 | Jeon | 340/686.2 |
| 2007/0058328 A1* | 3/2007 | Zuo et al. | 361/679 |
| 2007/0161271 A1* | 7/2007 | Seo | 439/131 |
| 2007/0230096 A1* | 10/2007 | Ryu et al. | 361/679 |
| 2008/0132303 A1* | 6/2008 | Naukkarinen et al. | 455/575.4 |

FOREIGN PATENT DOCUMENTS

| | | |
|---|---|---|
| JP | 2002094624 A | 3/2002 |
| JP | 2002152347 A | 5/2002 |
| JP | 2003-229934 A | 8/2003 |
| JP | 2003234809 A | 8/2003 |
| JP | 2003319042 A | 11/2003 |
| JP | 2004235897 A | 8/2004 |
| JP | 2004253480 A | 9/2004 |
| JP | 2005065205 A | 3/2005 |
| JP | 2005244592 A | 9/2005 |
| JP | 2005269566 A | 9/2005 |
| JP | 2005286994 A | 10/2005 |
| JP | 2005303663 A | 10/2005 |
| JP | 2005323242 A | 11/2005 |
| JP | 2005341480 A | 12/2005 |
| JP | 2006005564 A | 1/2006 |
| JP | 2006093999 A | 4/2006 |
| JP | 2006165854 A | 6/2006 |
| JP | 2006173794 A | 6/2006 |
| JP | 2006246353 A | 9/2006 |
| JP | 2006270804 A | 10/2006 |
| JP | 2006319419 A | 11/2006 |
| JP | 2006333079 A | 12/2006 |
| JP | 2006339698 A | 12/2006 |

OTHER PUBLICATIONS

Electronic Translation of JP 2006-319419, published on Nov. 24, 2006.*

International Search Report for PCT/JP2008/056057 mailed May 1, 2008.

U.S. Office Action for U.S. Appl. No. 12/593,428 mailed on Aug. 6, 2012.

Japanese Office Action for JP 2009-507509 mailed on Mar. 7, 2013 with English Translation.

* cited by examiner

MOBILE EQUIPMENT AND SLIDING STRUCTURE THEREFOR

TECHNICAL FIELD

The present invention relates to a sliding structure of a mobile equipment and a mobile equipment using it, and more particularly relates to a structure of a sliding mechanism of a mobile equipment such as a mobile phone, a digital camera, and an electronic notebook, and a mobile equipment using its structure.

BACKGROUND ART

In recent years, in a mobile equipment, portability is improved and usage applications spread to various fields such as transmission/reception of electronic mail, use of the Internet and a game function as well as simple speech call. For this reason, a mobile equipment is developed to have various mechanisms for a large screen of display unit and operability in character input. For example, a folded type of mobile equipment is carried in a folded state usually and is developed at the time of speech communication or mail transmission, to facilitate to view a large screen display and to input characters and commends, thereby allowing various operations. In the folded type, although an erroneous operation can be prevented when the mobile equipment is carried, the operation is substantially impossible in the folded state, since the display cannot be viewed. For this reason, there is a case that another display unit is provided to allow it to be viewed in the folded state. On the other hand, in a sliding type mobile equipment, a display unit is always exposed regardless of whether it is accommodated or extended, so that a display can be checked even in any state. Since the display remains in the exposed state in the accommodated state, namely, even in the carried state, a minimum key operation section is provided on a lower portion of the display, to allow the electronic mail to be read in its original state, and the key operation section to be operated to use the Internet, thereby improving the convenience. At the time of the operation when an electronic mail document is produced, the display section and the key operation section are slid in parallel, thereby exposing the key operation section provided on the lower portion of a liquid crystal display unit so as to permit the operation. As such a conventional technique, Japanese Patent Application Publication (JP-P2005-286994A: first conventional example) is known.

The first conventional example describes a sliding type mobile phone module. This sliding type mobile phone module is arranged between a main body and a cover unit in the mobile phone and opened/closed by sliding the cover unit on the main body. This mobile phone module contains a lower plate; an upper plate; and a first coil spring. The lower plate is coupled to the main body of the mobile phone. The upper plate is coupled to the cover unit of the mobile phone and slid on the lower plate. The first coil spring is fixed to the lower plate at one end by a first fixing pin, and is fixed to the upper plate at the other end by a second fixing pin and has a predetermined length. The upper plate is slid on the lower plate by the elastic force of the coil spring.

Also, a sliding mechanism of the sliding type mobile equipment can be sufficiently configured by using the outer side of en housing and having the shape of a character "U". However, there is a case of configuring the sliding mechanism as a separate part for preventing the wobbling state caused due to abrasion. As such a conventional technique, Japanese Patent Application Publication (JP-P2006-93999A: second conventional example) is known.

The second conventional example discloses a sliding type mobile phone. In this sliding type mobile phone, a first housing, a second housing, a sliding mechanism, a groove and a protrusion are provided. The first housing contains a display for displaying image data at least. The second housing contains a telephone microphone to which speech data is inputted. The sliding mechanism includes a slider for relatively moving the first housing and the second housing in parallel and slidably couples the first housing and the second housing through this slider. A first groove is formed on a rear surface opposite to a front surface of the first housing where the display is provided, to penetrate the first housing through the outer surface and inner surface. The sliding mechanism is provided on the inner surface side of the first housing. The second housing and the fixed slider are slid. A second groove is formed to extend along the first groove without penetrating the outer surface and inner surface of the first housing. A protrusion is formed on the front side of the second housing opposite to the first housing in the state that the first housing and the second housing are coupled by the sliding mechanism. The protrusion is engaged with the second groove.

Moreover, in the sliding type mobile equipment, there is a case in which the sliding mechanism is configured as a different part for improving an operational feeling. As such a conventional technique, Japanese Patent Application Publication (JP-P2005-303663A: third conventional example) is known.

The third conventional example discloses a sliding unit for a portable product and a portable product. This sliding unit for the portable product is provided between a portable product body and a cover that slidably covers the front of this portable product body and pushes this cover against the portable product body in an opening direction or closing direction. The sliding unit for the portable product is provided with a case arranged along the opening/closing directions of the cover; a slider that can be slid along the case; a coil spring for pushing the slider; a cam follower whose one end is supported by the slider; a guide for guiding the other end of the cam follower; and a linking member that is linked to the slider and linked to any one of the portable product body and the cover. Moreover, a pushing member is provided on one end side of the guide such that the movement of the other end of the cam follower is restricted with the pushing force based on elastic deformation when the slider is moved against the pushing of the coil spring.

The housing structures of the sliding type mobile equipments disclosed in those conventional examples have several problems.

At first, a great stroke cannot be reserved unlike that of the folded type mobile equipment. For example, Japanese Patent Application Publication (JP-P2005-286994A: first conventional example) indicates the typical sliding type mobile phone. This first conventional example has a mechanism in which two cylindrical bars whose both ends are supported serve as moving shafts so that a movable side is moved. In order to allow a horizontal movement, support sections of two or more portions are required along the moving direction. In this case, they are in line contact with the moving shafts in the longitudinal directions. In order to reserve the great stroke, a distance between the support sections is required to be made short. However, when the distance is made excessively short, a gap for the sliding appears as an angle when it is inclined. In addition, in this conventional example, the deflection of the moving shaft itself is generated. As those results, the rigidity is dropped. In case of the mobile phone, in order to carry out the communication when this is extended, the rigidity is required even when it is extended because of a load when it is pushed against an ear or when it falls. In view of this point, the distance between the support sections is required to be set as long as possible. As a result, the stroke is limited. Typically, the stroke is equal to or shorter than the half of the entire length when it is contracted, in many cases.

Next, because of the wobbling caused by the abrasion and for the purpose of the improvement of the operational feeling, the sliding mechanism is provided as the different part. Consequently, the apparatus volume and weight of the mobile phone are increased. From the viewpoint of the appearance design, the sliding mechanism is required to be provided inside the housing. However, when it is configured as the different part, the part volume thereof has influence on the apparatus volume. In the mobile phone, in view of its use scene, the structure that it is small in size and light in weight and easy in portability is the most important basic performance. However, even if the display can be always checked as the sliding type mobile phone, this is not meaningful if the apparatus becomes large. Thus, the sliding mechanism is desired to be as small and light as possible.

Furthermore, although the display can be always checked as the feature of the sliding type mobile phone, the display is enlarged to use this feature. In this case, the display is likely to be broken because the displaying parts such as a liquid crystal panel are usually made of glass. In order to prevent this, it is necessary to suppress the deformation by reserving a gap between the liquid crystal screen and the cover sufficiently and further increasing the rigidity of the housing.

In conjunction with the above examples, Japanese Patent Application Publication (JP-P2006-319419A: fourth conventional example) discloses a sliding type mobile terminal apparatus. This sliding type mobile terminal apparatus contains an operating unit housing in which a key operation unit is formed; a display panel protecting frame for holding a displaying panel; and a display housing that accommodates the display panel protecting frame and is slidably engaged with the operating unit housing. In this sliding type mobile terminal apparatus, a rail guide is integrally formed the is operating unit housing, and a rail unit that is slidably engaged with a rail guide is integrally formed in the displaying panel protecting frame, and a skirt unit that covers the rail guide and the rail unit from the outside is installed in the display housing.

Japanese Patent Application Publication (JP-P2002-94624A: fifth conventional example) discloses a wireless information terminal. In this wireless information terminal, a plurality of operation keys for data input and a display for displaying information are arranged in a small casing that can be carried. In this wireless information terminal, the casing is composed of a casing upper half body and a casing lower half body that are arranged in its longitudinal direction. The casing upper half body and the casing lower half body are slidably engaged with a frame and can be made close to or away from each other along the longitudinal direction. The display is attached to the frame. In an open state that the casing upper half body and the casing lower half body are separated from each other, the whole of the display screen of the display is exposed. In the close state that the casing upper half body and the casing lower half body are close to each other, a part of the display screen of the display is exposed.

Japanese Patent Application Publication (JP-P2004-253480A) discloses a sliding structure and a sliding type mobile phone. This sliding structure contains a main body having a guide groove and a sliding portion having a guide member that is engaged with the guide groove. This sliding structure is made of a synthetic resin material, and a rigidity of a main body has the Young' modulus of 45 GPa or more, a surface hardness of the guide groove has the Vickers hardness of 100 HV or more, and the guide member has the dynamic friction coefficient of 0.2 ●d or less. The main body surface including the guide groove is coated with a coating material including a slipping agent.

Japanese Patent Application (JP-P2006-246353A: sixth conventional example) discloses a mobile terminal apparatus. This mobile terminal apparatus has an upper housing, a lower housing, a pair of slide grooves, a pair of slide grooves, a pair of connection holes, a pair of connection holes, a pair of upper housing slide connection members and a pair of lower housing slide connection members. The pair of slide grooves is formed along the longitudinal direction of the upper housing, closely to both sides of the upper housing in the region of the approximately lower half of the upper housing. The pair of slide grooves is formed along the longitudinal direction of the lower housing, closely to both sides of the lower housing in the region of the approximately upper half of the lower housing. The pair of connection holes is formed on the upper housing side so that they can be viewed through the slide grooves formed in the lower housing and they are located near the lower ends of the slide grooves formed in the lower housing when the opposing sides of the upper housing and the lower housing overlap with each other. The pair of connection holes is formed on the lower housing side so that they can be viewed through the slide grooves formed in the upper housing and they are located near the upper ends of the slide grooves formed in the upper housing when the opposing sides of the upper housing and the lower housing overlap with each other. The pair of upper housing slide connection members is slidably engaged along the slide grooves formed in the upper housing. The pair of lower housing slide connection members is slidably engaged along the slide grooves formed in the lower housing. As for the upper housing and the lower housing, in a state that the opposing sides overlap with each other, the upper housing slide connection member engaged with the slide grooves formed in the upper housing is fixed to the connection holes formed in the lower housing, and the lower housing slide connection member engaged with the slide grooves formed in the lower housing is fixed to the connection holes formed in the upper housing. Consequently, the upper housing and the lower housing are slidably connected to each other.

Japanese Patent Application Publication (JP-P2006-333079A) describes a sliding type mobile communicating apparatus. In this sliding type mobile communicating apparatus, a first housing, a second housing and a slide module are provided. This slide module includes a guide member in which grooves are formed; a slide member that is fixed to the second housing and can be slid along the guide member; a shaft member that is fixed to the guide member and restricts the sliding of the slide member; and an elastic member that is formed in this shaft member and applies elastic force to the slide member, so as to slide the slide member along the shaft member. This slide module links the second housing to the first housing so that they can be moved relatively in parallel.

DISCLOSURE OF INVENTION

An object of the present invention is to provide a sliding mechanism of a mobile equipment, which has a small size and a high strength although being a simple mechanism, which can take a large stroke length and can protect a display unit from being damaged and has a high rigidity, while keeping the small size and a thin structure, and a mobile equipment using the sliding mechanism.

The sliding structure of the present invention is for the mobile equipment, and contains a second housing and a first housing slidably provided in the second housing. The sliding structure contains a display frame configured to accommodate a display unit of the first housing and having a slide groove on a side wall parallel to a slide direction; and a slide support section provided along a side wall of the second housing parallel to the slide direction such that a tip is slidably engaged with the slide groove.

The mobile equipment of the present invention contains a second housing, a first housing slidably provided for the second housing, and a sliding structure. The sliding structure contains the display frame configured to accommodate a display unit of the first housing and having a slide groove on a side wall parallel to the slide direction; and a slide support section provided along a side wall of the second housing parallel to the slide direction such that a tip is slidably engaged with the slide groove.

According to the present invention, it is possible to obtain the sliding mechanism of the mobile equipment, which has the simple mechanism, the small size and the high strength and which can take the large stroke length, and which can protect the display unit from being damaged and has the high rigidity, while keeping the small size and the thin structure, and the mobile equipment.

BRIEF DESCRIPTION OF DRAWINGS

The objects, effects and features of the present invention will be evident from the descriptions of the exemplary embodiments in linkage with the attached drawings.

BEST MODE FOR CARRYING OUT THE INVENTION

Thereinafter, the mobile equipment and the sliding mechanism thereof according to the exemplary embodiments of the present invention will be described with reference to the attached drawings. Here, as the mobile equipment, a mobile phone will be described as an example. However, the present invention is not limited to this example. The present invention can be applied to even a different mobile equipment such as a digital camera, an electronic notebook and a mobile game machine.

Figure 1:
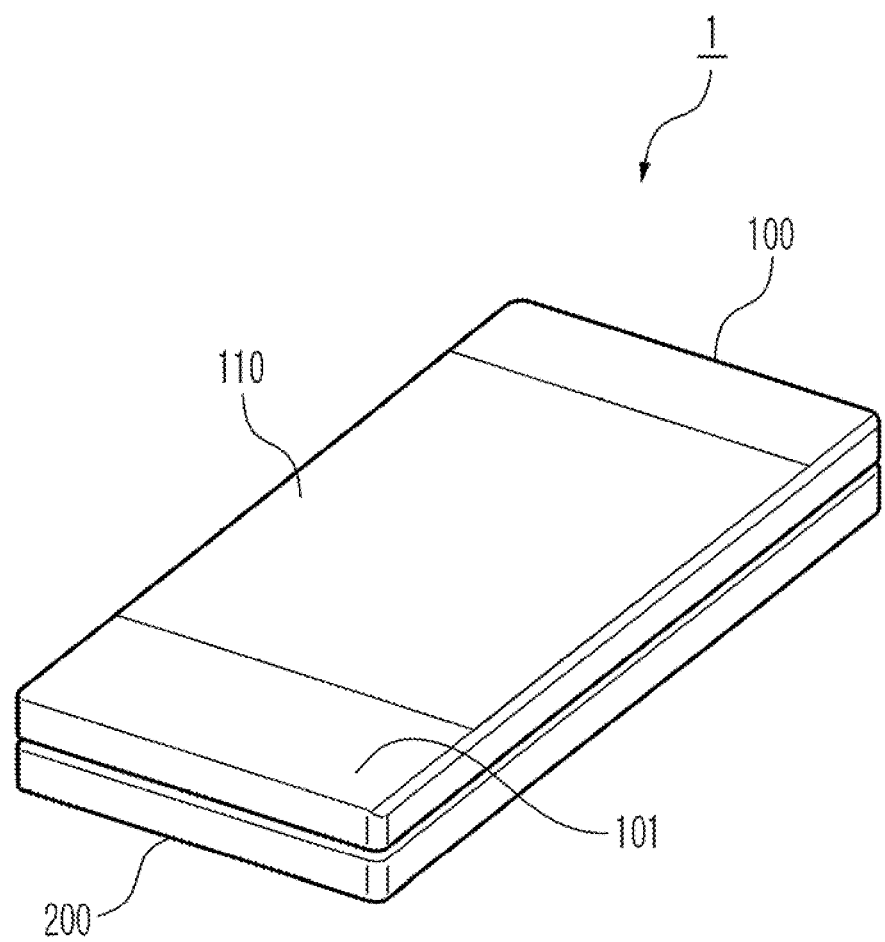
FIG. 1 is a perspective view showing a configuration of a mobile phone to which a sliding structure of a mobile equipment according to the exemplary embodiment of the present invention is applied.
Figure 2:
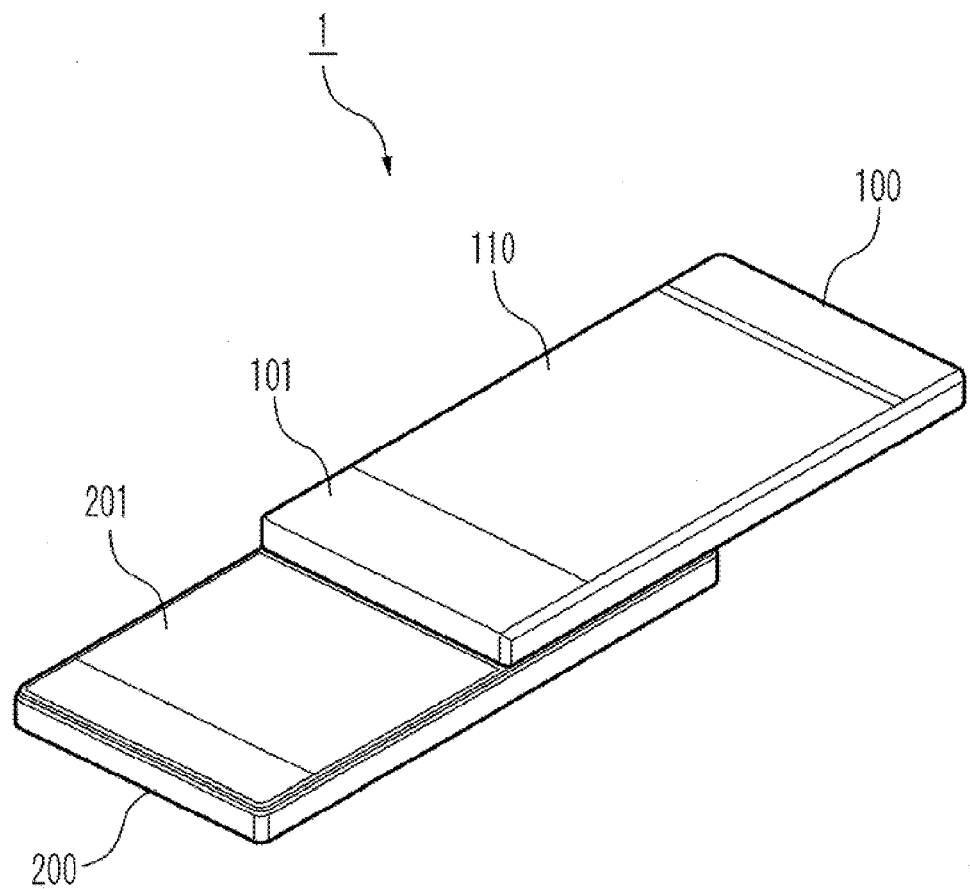
FIG. 2 is a perspective view showing a configuration of the mobile phone to which the sliding structure of the mobile equipment according to the exemplary embodiment of the present invention is applied.

FIGS. 1 and 2 are perspective views showing the configuration of the mobile phone to which the sliding mechanism of the mobile equipment according to an exemplary embodiment of the present invention is applied. FIG. 1 shows an accommodation state, and FIG. 2 shows an extension state.

A mobile phone 1 is mainly divided into an upper housing 100 and a lower housing 200. A receiver, a display, basic operation keys, and a sub board (these parts are not shown) are built in the upper housing 100. The main parts (not shown) such as a key operation unit, a microphone, an external connector, a speaker, a vibration motor, a battery 221, and a camera are built in the lower housing 200 in addition to a main board 222. Those main parts are connected to the main board. The upper housing 100 is slidably supported by the lower housing 200.

In the accommodation state, a screen 110 and an operation key provided section 101 appear on the upper housing 100. Thus, a user can view the screen 110 and can operate keys (not shown) on a surface of the operation key provided section 101. In the extension state, since the upper housing 100 is slid on the lower housing 200 by the sliding mechanism according to the exemplary embodiment of the present invention, an operation key provided section 201 appears on the lower housing 200. Therefore, the user can view the screen 110 and can operate keys (not shown) on a surface of the operation key provided section 201.

Figure 3:
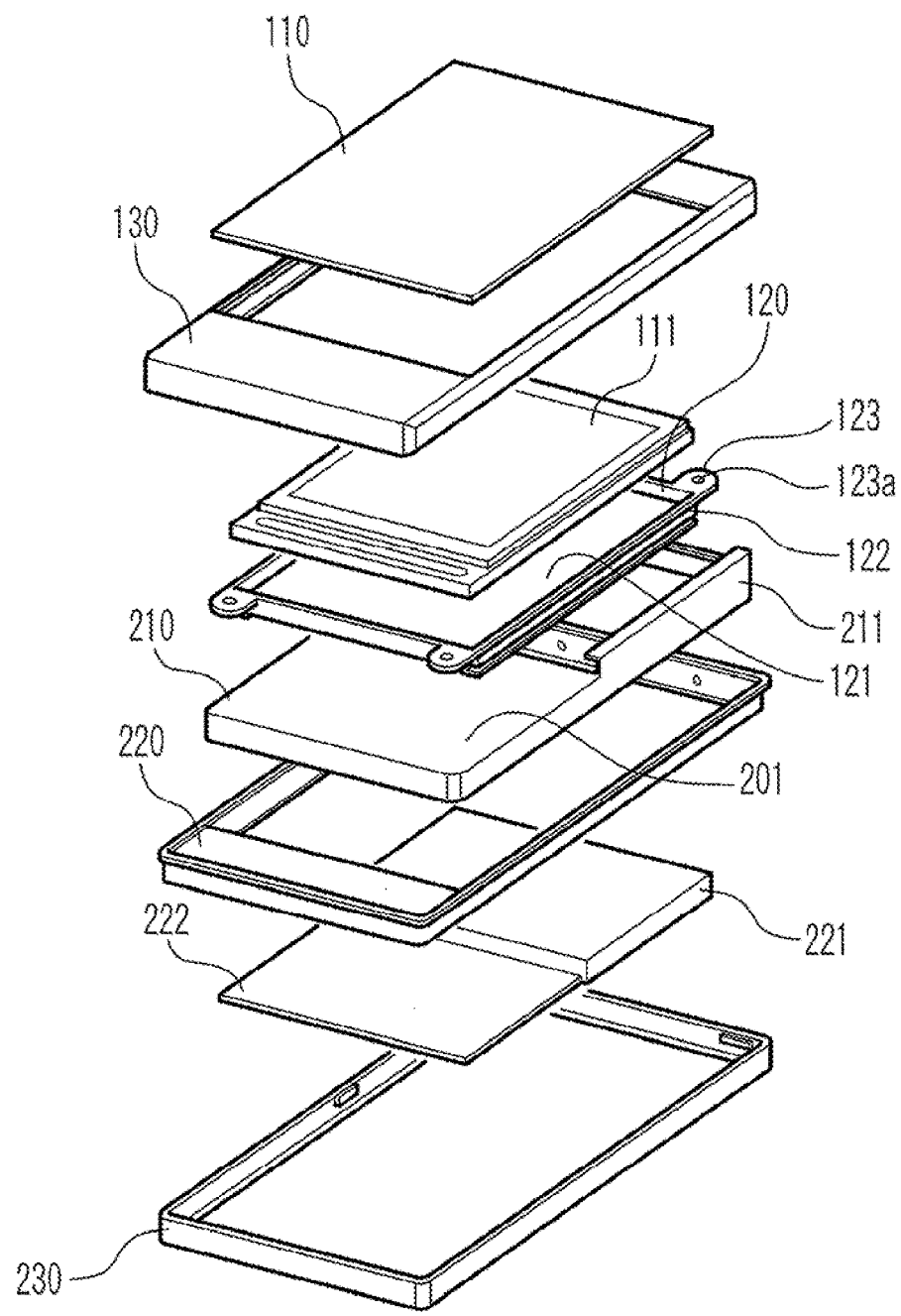
FIG. 3 is an exploded view of the mobile phone shown in FIG. 1.
Figure 4:
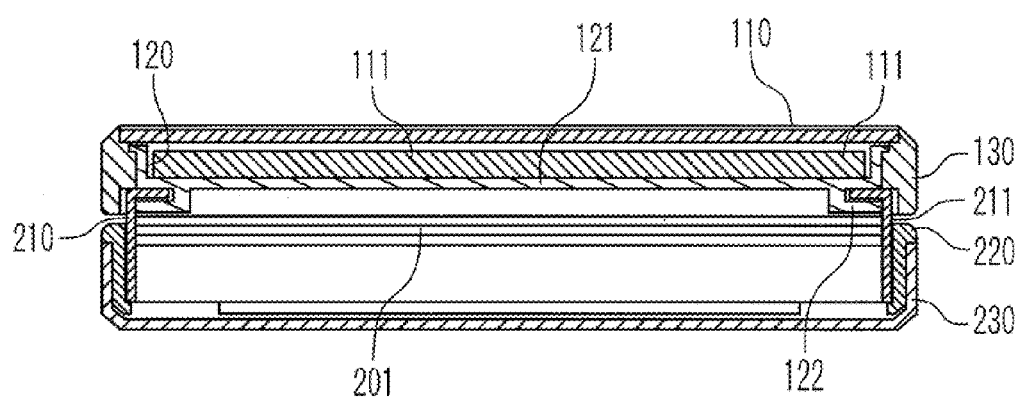
FIG. 4 is a section view of the mobile phone in FIG. 1.

FIG. 3 is an exploded view of the mobile phone shown in FIG. 1, and FIG. 4 is a section view of the mobile phone in FIG. 4. The upper housing 100 contains a screen 110, a display unit 111, a display frame 120 and an outer housing 130. The display unit 111 is a display panel that includes a driver, and exemplified in a liquid crystal display panel, and has the shape of an approximate rectangle. The display frame 120 contains the display unit 111, and is composed of a rectangular bottom surface and four side walls extending vertically to the four sides.

The outer housing 130 is the housing configuring a basic shape of the upper housing 100 and is mounted with the sub board (not shown) and includes the display frame 120. Although this has the shape of a thin rectangular parallelepiped, the regions of the screen 110 and the display unit 111 are opened. Also, the outer housing 130 has an opening in the region through which wirings pass, as necessary. The screen 110 is fitted on one surface of the outer housing 130 and forms its one side.

The display frame 120 contains a display unit provided section 121, slide grooves 122 and attaching sections 123 (including attachment holes 123a). The display unit provided section 121 is a region surrounded by the side walls on the bottom surface of the display frame 120, and the display unit 111 is provided therein. The slide grooves 122 are formed on the two opposite side walls parallel to the slide direction of the upper housing 100, among the four side walls of the display frame 120. They serve as guides (slide guides) of the sliding mechanism. The attaching sections 123 are formed on the two opposite side walls perpendicular to the slide direction of the upper housing 100, among the four side walls of the display frame 120. The display frame 120 and the outer housing 130 are screwed in the attachment holes 123a of the attaching sections 123. However, the display frame 120 and the outer housing 130 may be adhered or may be formed as a unitary body.

The lower housing 200 contains a supporting housing 210, an outer housing 220 and a back cover 230.

The supporting housing 210 slidably supports the upper housing 100 (the display frame 120) in a predetermined direction and has the shape of a thin rectangular parallelepiped. However, a part of the two opposite sides parallel to the slide grooves 122 extends in the direction of the slide groove 122 ( slide support sections 211: which will be described later). The outer housing 220 is a housing that has a frame structure and configures the basic shape of the lower housing 200. Also, the outer housing 220 includes and holds the supporting housing 210. The back cover 230 is a cover that contains therein the main board 222 and the battery 221 and also includes and holds the outer housing 220. The supporting housing 210 and the outer housing 220 can be adhered or formed as a unitary body. The back cover 230 is screwed to the outer housing 220 from a rear side.

The supporting housing 210 contains a slide support section 211 and the operation key provided surface 201. The slide support section 211 is formed such that a part of the two opposite side walls parallel to the slide grooves 122 in the supporting housing 210 extends in the direction of the slide grooves 122. The tip of the side wall extending in the direction of the slide groove 122 is bent inside the slide groove 122. In this way, since the tip is slidably engaged with the slide groove 122, the display frame 120 is slidably supported in the supporting housing 210.

Figure 5A:
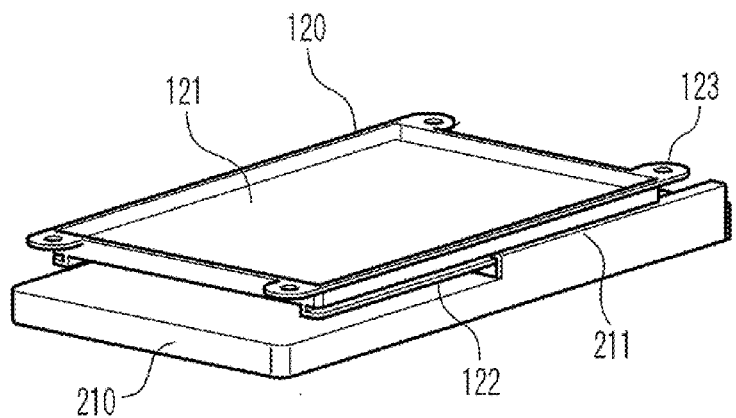
FIG. 5A is a perspective view showing the sliding structure of the mobile phone in FIG. 1.
Figure 5B:
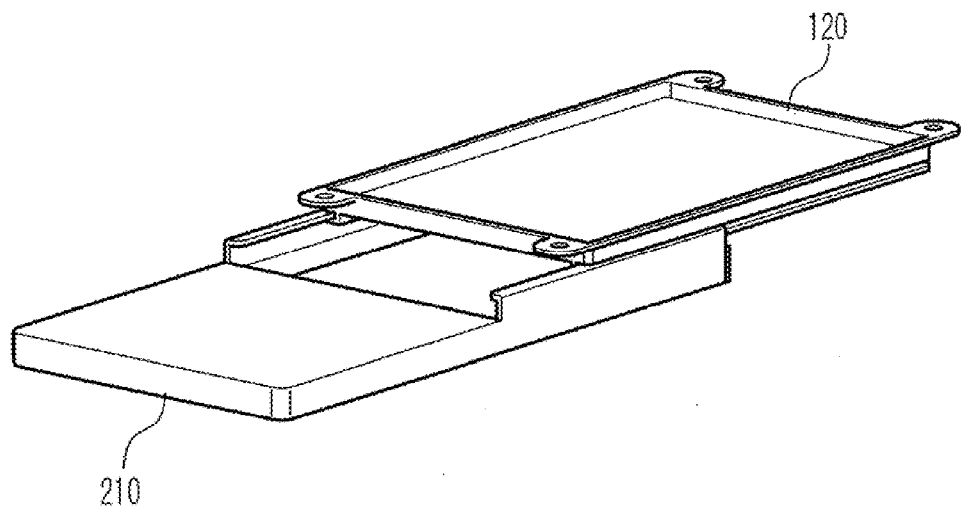
FIG. 5B is a perspective view showing the sliding structure of the mobile phone in FIG. 1.

FIG. 5A and FIG. 5B are perspective views showing the structure of the sliding mechanism in the mobile phone shown in FIG. 1. FIG. 5A shows the accommodation state, and FIG. 5B shows the extension state. Here, for the purpose of the easy understanding, only the display frame 120 and the supporting housing 210 are shown. In FIG. 5A and FIG. 5B, the slide support section 211 in the supporting housing 210 is slid inside the slide grooves 122 in the display frame 120. Thus, the upper housing 100 is slid on the lower housing 200. In the extension state, the display frame 120 is greatly overhung, as compared with the supporting housing 210. The concave shape of the display unit provided section 121 in the display frame 120 makes the display frame 120 high in rigidity although the display frame 120 is thin in thickness. Moreover, the rigidity of the display frame 120 is increased because of the slide groove 122 of a rib structure. Thus, even if the overhang is set great, the deformation does not occur.

Desirably, the display frame 120 and the supporting housing 210 are made of metals, and they are the unitary products made of magnesium alloy or zinc alloy. Also, if they are made of stainless by using metal injection, the rigidity can be further increased. When those parts are made of metal, lubrication is required to smoothly slide them. The lubrication using grease is sufficiently possible. However, when it is considered that the mobile phone is always used by the user under various use environments, especially under a high temperature, it is necessary to protect the grease from flowing into the housing and further from flowing out from the housing. As a lubricating method other than the grease, there is a solid lubrication through a surface treatment. The solid lubrication allows the sufficiently smooth sliding to be attained. Also, when a certain degree of thickness can be reserved, this can be made of resin. In this case, through the selection of the resin having a high sliding property, the sliding mechanism can be used the use without execution of any surface lubricating process.

Figure 6:
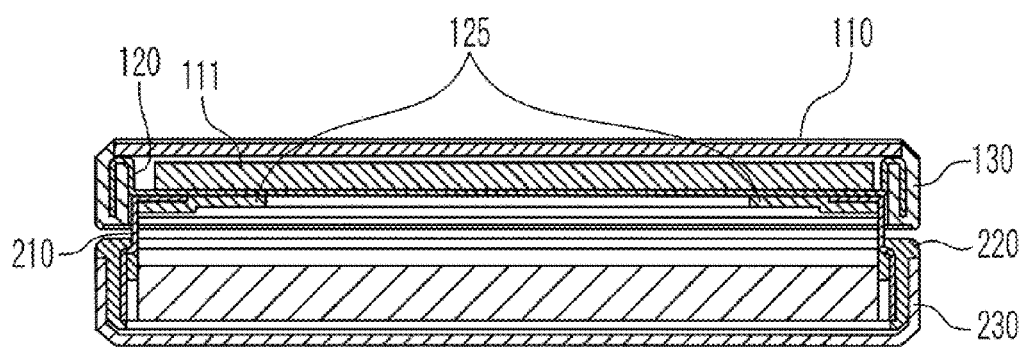
FIG. 6 is a section view showing a configuration of the mobile phone to which a sliding structure of the mobile equipment according to another exemplary embodiment of the present invention is applied.

In the above-mentioned exemplary embodiment, the display frame 120 and the slide groove 122 are formed as a same part (as a unitary body). However, the display frame 120 and the slide groove 122 may be configured as different parts. FIG. 6 is a section view showing the configuration of the mobile phone to which the sliding mechanism of the mobile equipment according to another exemplary embodiment of the present invention is applied. As shown in FIG. 6, by welding, screwing or adhering a slide plate 125 to the display frame 120, the slide groove 122 can be formed as the different part. In this case, since this is formed as the different part, the display frame 120 can be manufactured by a sheet metal press. Since the pressing process is employed, the thickness of the display frame 120 can be made thinner, as compared with the molded product. Thus, the apparatus can be miniaturized.

Figure 7:
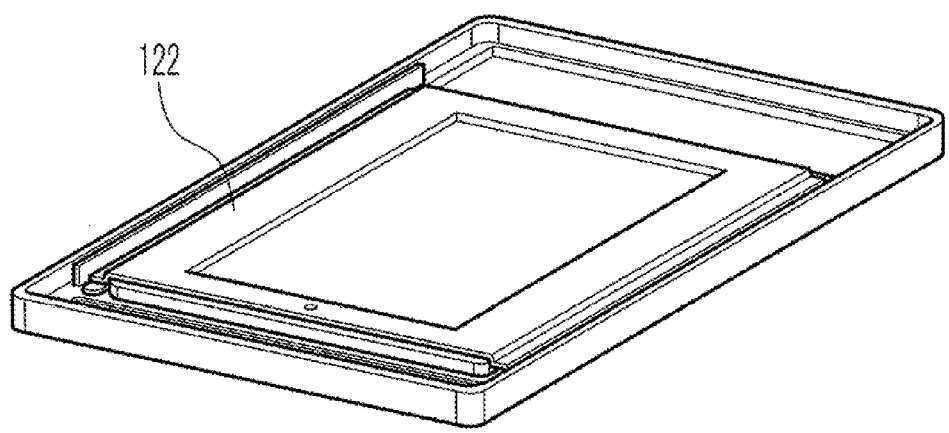
FIG. 7 is a perspective view of a sliding structure of the mobile equipment according to still another exemplary embodiment of the present invention is applied.
Figure 8:
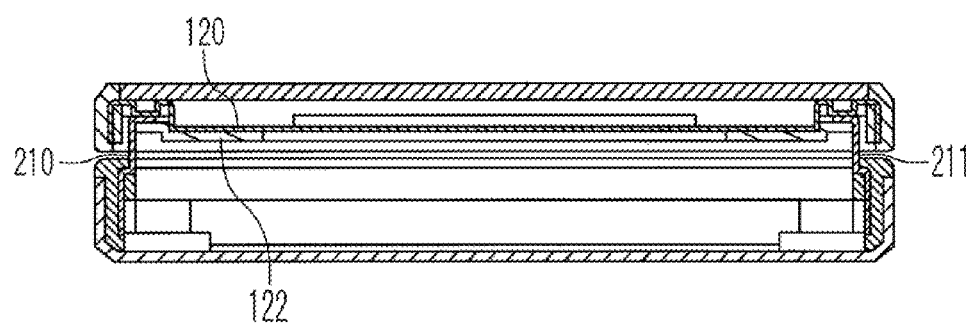
FIG. 8 is a section view of the mobile phone to which the sliding structure shown in FIG. 7 is applied.

When the display frame 120 and the slide groove 122 are formed as the different parts, the following configuration is possible. FIG. 7 is a perspective view of the sliding mechanism of the mobile equipment according to still another exemplary embodiment of the present invention. FIG. 8 is a section view of the mobile phone to which the sliding mechanism shown in FIG. 7 is applied. As shown in FIG. 8, the display frame 120 has a portion that is protruded from the bottom surface of the display frame 120. The support section 211 in the supporting housing 210 is slid between the concave portion formed on the housing and the slide groove 122. Since the slide groove 122 does not contribute to the thickness direction, the housing can be made thin.

As shown in FIG. 8, the slide groove (slide groove portion) 122 has a protrusion that protrudes in a lateral direction from the bottom surface portion of the display frame 120. The protrusion is formed on the same flat surface as the bottom surface of the display frame 120. Here, the lateral direction is perpendicular to the slide directions of the upper housing 100 and the lower housing 200 and those thickness directions. The protrusion extends in the slide direction. The display frame 120 contains a convex formation section that extends in the slide direction opposite to the protrusion. A convex portion that is convex towards the protrusion is formed on the convex formation section. The convex portion is formed to extend in the slide direction, for example, by the pressing process. The convex portion contributes to the strength of the display frame 120. The support section 211 is slid between the protrusion and the convex portion.

A touch panel function of an electrostatic capacitance type or resistance type can be added to the screen 110. When a touch panel is employed, the pushing pressure is applied through the screen to the displaying panel. However, since the display unit provided section 121 is integrated with the guide, this is advantageous from the viewpoint of the strength reservation. Thus, such a structure is also effective. Instead of the touch panel, it is possible to provide a key of a mechanical type such as a dome key structure or rubber type key structure in which a part of the usual screen is cut away.

The following effect can be obtained from the above-mentioned exemplary embodiment.

The first effect is in that by making the display frame 120 responsible for the function of the sliding mechanism, the number of parts can be reduced as compared with a case that the sliding mechanism is configured as the different part.

As represented by Japanese Patent Application Publication (JP-P2005-303663A), the sliding surface is required to be configured by the parts having the high sliding properties, in order to configure the sliding mechanism whose operational feeling is good, and for the sake of the stable sliding, the slide surface is required to have a high rigidity and a high flatness. The second effect is in that since the display frame 120 and the sliding mechanism are integrated, the high rigidity can be expected, and the maintenance of the high flatness is easy in view of manufacturing the part as compared with a case that they are configured as the different parts.

The third effect is in that the large screen and the long stroke can be both attained. The slide surface described with respect to the second effect requires a summation of the stroke length and the holding length, and when the stroke length is long, this becomes great. Since the display frame 120 functions as the slide surface, as the size of the screen becomes larger, the display frame 120 becomes larger. Therefore, as a result, the great stroke can be obtained.

The fourth effect is in that, since the display frame 120 serving as a slide guide is made of metal and functions an external portion, the housing having both of the small size and the high rigidity can be configured.

Some of the sliding structures of the mobile equipments and the mobile equipments according to the above-mentioned exemplary embodiments can be summarized as follows.

The sliding structure of the mobile equipment contains the second housing and the first housing slidably formed in the second housing. This sliding structure contains the display frame which has the slide groove along the side wall parallel to the slide direction, and which accommodates the display of the first housing; and the slide support section which is formed along the side wall of the second housing parallel to the slide direction and whose tip is slidably engaged with the slide groove. Thus, the display frame supporting the displaying apparatus is used to configure the slide mechanism. Thus, it is possible to suppress the higher strength of the display frame due to the larger size of display unit, and the increase of parts when the slide mechanism is configured as the different parts. Due to these effects, it is possible to configure the mobile equipment of the sliding type (Exemplification: Mobile Telephone) in which the larger size and higher rigidity of the display unit are both attained, without making the size of the mobile equipment large.

In the foregoing sliding structure, the display frame is preferred to have the slide grooves on the two side walls opposing in parallel to the slide direction, respectively. Preferably, the slide support section is formed along the two side walls of the second housing opposing in parallel to the slide direction, and the tip is slidably engaged with the slide groove.

In the foregoing sliding structure, preferably, the display frame is made of metal and screwed or adhesively fixed to the external housing of the first housing.

In the foregoing sliding structure, preferably, the display frame is made of metal and formed as a unitary body with the external housing of the first housing.

In the foregoing sliding structure, preferably, the display frame is made of the lubricating resin.

In the foregoing sliding structure, the display frame is preferred to contain a plate member that is provided for the side wall of the display frame and extends in the slide direction. The slide groove is preferred to be formed in the gap between the side wall of the display frame and the plate member. The plate member is welded, screwed or adhered to the display frame.

In the foregoing sliding structure, the display frame is preferred to be manufactured by a pressing process of the metal sheet.

The mobile equipment contains the sliding structure described in one of the foregoing respective items; the second housing; and the first housing slidably formed in the second housing.

The present invention is not limited to the above-mentioned respective exemplary embodiments, and within the range of the technical idea of the present invention, it is evident that the respective exemplary embodiments can be suitably modified or changed.

This application is the National Phase of PCT/JP2008/056057, filed Mar. 28, 2008, claims a priority on convention based on Japanese Patent Application No. 2007-095233 filed on Mar. 30, 2007. The disclosure thereof is incorporated herein by reference.

The invention claimed is:

1. A sliding structure of a mobile equipment comprising a second housing and a first housing slidably provided for said second housing, said sliding structure comprising:
   a display frame configured to accommodate a display unit of said first housing and having slide grooves provided for side walls in parallel to a direction of the slide, said slide grooves having a side formed by a bottom of the display frame; and
   a slide support section provided along side walls of said second housing in parallel to the slide direction such that tip portions of said slide support section slidably engage with said slide grooves,
   wherein the display frame comprises:
   a first side plate forming a portion to mount a display unit; and
   a second side plate protruding from a bottom surface of the display frame and forming a bottom of the slide grooves,
   wherein the second side plate is located at a position different than and inner to the first side plate in a width direction of the display frame.

2. The sliding structure according to claim 1, wherein said display frame has said slide grooves provided for two of said side walls opposing in parallel to the slide direction, respectively, and
   said slide support section provided along two of said side walls of said second housing in parallel to the slide direction such that tip portions of said slide support section slidably engage with said slide grooves.

3. The sliding structure according to claim 2, wherein said display frame is made of metal and is fixed to an exterior housing of said first housing with screws or adhesion.

4. The sliding structure according to claim 2, wherein said display frame is made of metal and is formed as a unitary body with an exterior housing of said first housing.

5. The sliding structure according to claim 2, wherein said display frame is made of lubricating resin.

6. The sliding structure according to claim 1, wherein said display frame comprises a plate member provided for each of said two side walls to extend in the slide direction,
   said slide groove is formed between said side wall and said plate member in said display frame, and
   said plate member is fixed to said display frame with welding, screws or adhesion.

7. The sliding structure according to claim 1, wherein said display frame is formed by a pressing process of metal sheet.

8. The sliding structure according to claim 1, wherein the inner side surface of the first side plate is located outer to the outer side surface of the second side plate.

9. The sliding structure according to claim 1, wherein the slide grooves are formed on an area of the display frame opposite to an area in which the display unit is accommodated.

10. A mobile equipment comprising:
    a second housing;
    a first housing slidably provided for said second housing; and
    a sliding structure,
    wherein said sliding structure comprises:
    a display frame configured to accommodate a display unit of said first housing and having slide grooves provided for side walls in parallel to a direction of the slide, said slide grooves having a side formed by a bottom of the display frame; and a slide support section provided along side walls of said second housing in parallel to the slide direction such that tip portions of said slide support section slidably engage with said slide grooves, wherein the display frame comprises:

a first side plate forming a portion to mount the display unit; and a second side plate protruding from a bottom surface of the display frame and forming a bottom of the slide grooves, wherein the second side plate is located at a position different than and inner to the first side plate in a width direction of the display frame.

11. The mobile equipment according to claim 10, wherein said display frame has said slide grooves provided for two of said side walls opposing in parallel to the slide direction, respectively, and said slide support section provided along two of said side walls of said second housing in parallel to the slide direction such that tip portions of said slide support section slidably engage with said slide grooves.

12. The mobile equipment according to claim 11, wherein said display frame is made of metal and is fixed to an exterior housing of said first housing with screws or adhesion.

13. The mobile equipment according to claim 11, wherein said display frame is made of metal and is formed as a unitary body with an exterior housing of said first housing.

14. The mobile equipment according to claim 11, wherein said display frame is made of lubricating resin.

15. The mobile equipment according to claim 10, wherein said display frame comprises a plate member provided for each of said two side walls to extend in the slide direction, said slide groove is formed between said side wall and said plate member in said display frame, and said plate member is fixed to said display frame with welding, screws or adhesion.

16. The mobile equipment according to claim 10, wherein said display frame is formed by a pressing process of metal sheet.

17. The mobile equipment according to claim 10, wherein the inner side surface of the first side plate is located outer to the outer side surface of the second side plate.

18. The mobile equipment according to claim 10, wherein the slide grooves are formed on an area of the display frame opposite to an area in which the display unit is accommodated.

* * * * *